United States Patent [19]

Yokoe

[11] 3,840,792
[45] Oct. 8, 1974

[54] NUMERICAL CONTROL DEVICE FOR MACHINE TOOLS

[75] Inventor: Isamu Yokoe, Obu, Japan

[73] Assignee: Toyoda Koki Kabushiki Kaisha, Kariya, Aichi-Pref., Japan

[22] Filed: Jan. 9, 1973

[21] Appl. No.: 322,212

[30] Foreign Application Priority Data
Jan. 13, 1972  Japan.............................. 47-5975

[52] U.S. Cl................ 318/572, 318/603, 318/632, 51/165.87
[51] Int. Cl............................................ G05b 19/24
[58] Field of Search............... 318/572, 603, 632; 51/165.87, 165.71, 165.88

[56] References Cited
UNITED STATES PATENTS
| | | | |
|---|---|---|---|
| 3,073,998 | 1/1963 | Bower.............................. | 318/572 |
| 3,646,419 | 2/1972 | Holy et al. ...................... | 318/572 |
| 3,679,955 | 7/1972 | Rhoades ......................... | 318/572 |
| 3,727,493 | 4/1973 | Lahm............................... | 318/572 X |
| 3,746,956 | 7/1973 | Takegawa........................ | 318/572 |

*Primary Examiner*—B. Dobeck
*Attorney, Agent, or Firm*—Oblon, Fisher, Spivak, McClelland & Maier

[57] ABSTRACT

A numerical control device for machine tools, especially for grinding machines, comprises pulse generators which generate pulse signals of a predetermined number corresponding to the amount of time of one dressing on a grinding wheel, counters which respectively integrate the pulse signals from the pulse generators for storing the total dressing amount for the grinding wheel, and operation means which serve to add or subtract the contents in the counter corresponding to the total dressing amount from numerical information which is provided for controlling the relative movement between a workpiece and the grinding wheel, whereby the numerical information is compensated in accordance with the reduction of the grinding wheel dimension.

10 Claims, 5 Drawing Figures

NUMERICAL CONTROL DEVICE FOR MACHINE TOOLS

BACKGROUND OF THE INVENTION

1. Field Of The Invention

The present invention relates generally to a numerical control device for machine tools, and more particularly to a new and imporoved unique control device for grinding machines.

2. Description Of The Prior Art

In a grinding machine, a grinding wheel must be dressed or trued for finely or precisely machining workpieces. Since the dressing of the grinding wheel operates to reduce its radius, its width or both, it is necessary to compensate for the relative movement or position between the workpiece and the grinding wheel for the next grinding operation in accordance with this reduction in radius and/or width to prevent the production of workpieces with size errors.

In the past, this compensation was performed by compensating mechanisms specially constructed for each grinding machine. Thus, the machine structure was complicated and had to be changed together with the modification of the compensating mechanisms in each different conventional grinding machine. Furthermore, this mechanical compensation was apt to be inaccurate since the compensation was performed by the compensating movement of a movable member, such as a wheel head which has heavy weight. In addition, in the conventional grinding machine, it was difficult to realize a useful and simple compensating mechanism or means for compensating the relative position between the shoulder portion of the workpiece and the end grinding surface of the grinding wheel which was dressed after a shoulder grinding operation.

SUMMARY OF THE INVENTION

Accordingly, one object of the present invention is to provide a new and improved unique numerical control device for automatically and numerically compensating for a reduction of a cutting or grinding tool serving to machine a workpiece.

Another object of the present invention is the provision of a new and improved unique numerical control device which is adaptable to a wide range of machine tools.

A further object of the present invention is to provide a new and improved unique numerical control device for machine tools serving to simplify the machine structure.

Briefly, in accordance with this invention, the foregoing and other objects are in one aspect attained through the provision of a numerical control device comprising a numerical control information source, decoding means for decoding the numerical control information, integrating means for automatically integrating and storing a decrement amount of cutting tool means, operating means for automatically compensating numerical data on a movement of the machine tool by the decrement amount integrated in the integrating means, and drive control means for controlling the movements of the machine tools by compensated numerical data out of the operating means in accordance with the decrement amount of the cutting tool means, whereby machining operations are correctly performed corresponding to the numerical control information.

BRIEF DESCRIPTION OF THE DRAWINGS

A more complete appreciation of the invention will be readily obtained as the same becomes better understood from the following detailed description of the preferred embodiment of the present invention when considered in connection with the accompanying drawings in which.

DETAILED DESCRIPTION OF THE PREFERRED EMBODIMENTS

Figure 1:
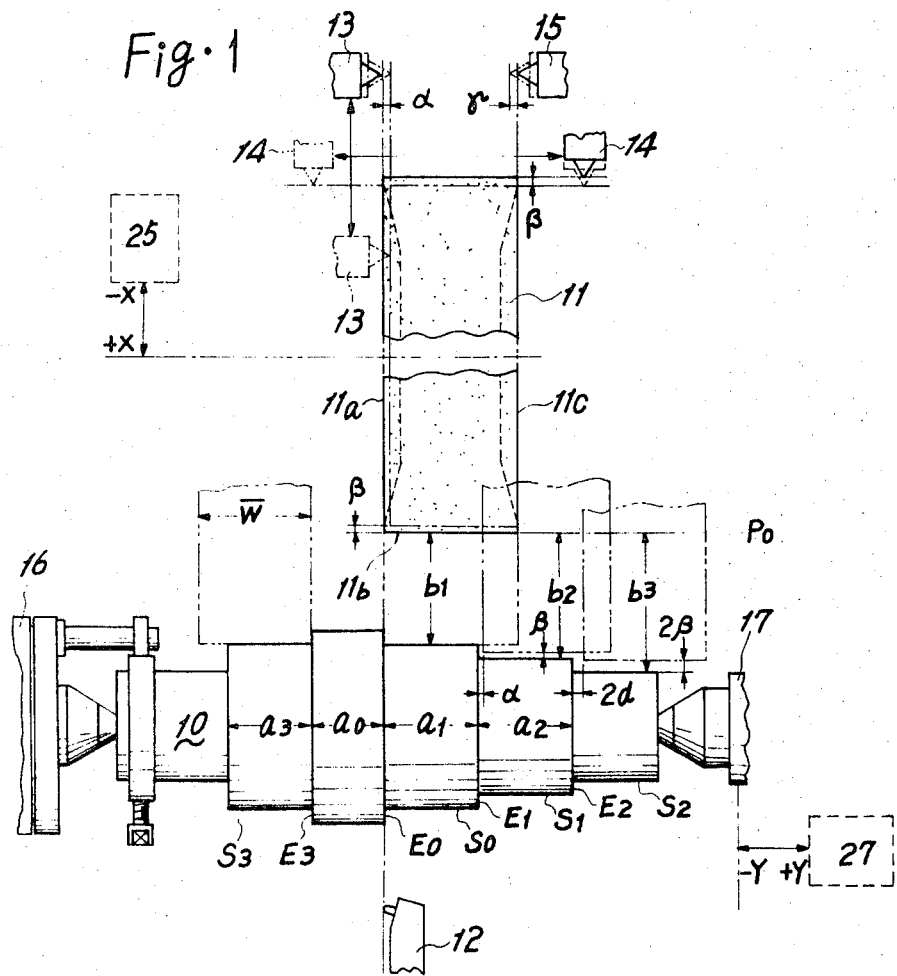
FIG. 1 is a schematic view of a grinding machine for explaining a grinding and trueing cycle.

Referring now to the drawings, wherein like reference numerals designate identical or corresponding parts throughout the several views, and more particularly to FIG. 1 thereof wherein a conventional cylindrical grinding machine, and grinding and trueing operations are schematically shown. In FIG. 1, a workpiece 10 which has working portions of shoulders E0 to E3 and cylindrical surfaces S0 to S3 is supported by a workhead 16 and a tailstock 17 which are mounted on a traverse table (not shown) slidably mounted on a bed (not shown) and is movable longitudinally, that is, in a Y-axis direction by a stepping motor 27. The workpiece 10 is rotated by the workhead 16 at a predetermined rotational speed. A grinding wheel 11 is mounted on a wheelslide (not shown) which is slidably mounted on the bed and is movable transversely, that is, in a X-axis direction by a stepping motor 25. This grinding wheel 11 is rotated by an electric motor (not shown) and is dressed by diamond chips 13, 14, 15 of a dressing apparatus (not shown) mounted on a wheelslide (not shown) on it's end grinding surfaces 11a and 11c and cylindrical grinding surface 11 b by predetermined dressing amounts $\alpha$, $\gamma$ and $\beta$ in each dressing operation. For an initial positioning of the workpiece 10 in the Y-axis direction, a sizing device (not shown) is mounted on the bed and is movable in the X-axis direction. A feeler or a contact element 12 of the sizing device is precisely aligned on an extension line of the initial end grinding surface 11a of the grinding wheel 11.

For example, when the workpiece 10 is machined, the sizing device, that is, the feeler 12 is first advanced toward the workpiece 10 by a predetermined amount to be able to contact the shoulder E0, and thereafter the workpiece 10 is moved in the right (+Y) direction in FIG. 1 by the stepping motor 27 until the shoulder E0 of the workpiece is in contact with the feeler 12. Following these operations, the workpiece 10 is further shifted by a predetermined small amount, for example 0.01 millimeter, which is equal to a removal amount of grinding depth on the shoulder E0. Thereafter, the grinding wheel 10 mounted on the wheelslide is fed toward the workpiece 10 by a distance $b1$ at a rapid speed, a shoulder grinding speed, a rough grinding speed and finally a fine grinding speed in that order, so that the shoulder E0 and the cylindrical surface S0 are finished. Usually, the finished shoulder E0 is adopted as a machining reference portion for the longitudinal positioning of the workpiece, and therefor, the other work portions E1 to E3 and S1 to S3 are machined by simple numerical controls without the sizing device.

In the foregoing grinding operations, the grinding wheel 10 must be trued after a grinding operation or a predetermined number of grinding operations for accurately machining the other work portions or another workpiece as mentioned above.

The reduction of the grinding wheel due to the trueing thereof can be numerically and perfectly compensated through the provision of the numerical control device shown in FIGS. 2 to 5.

Figure 2:
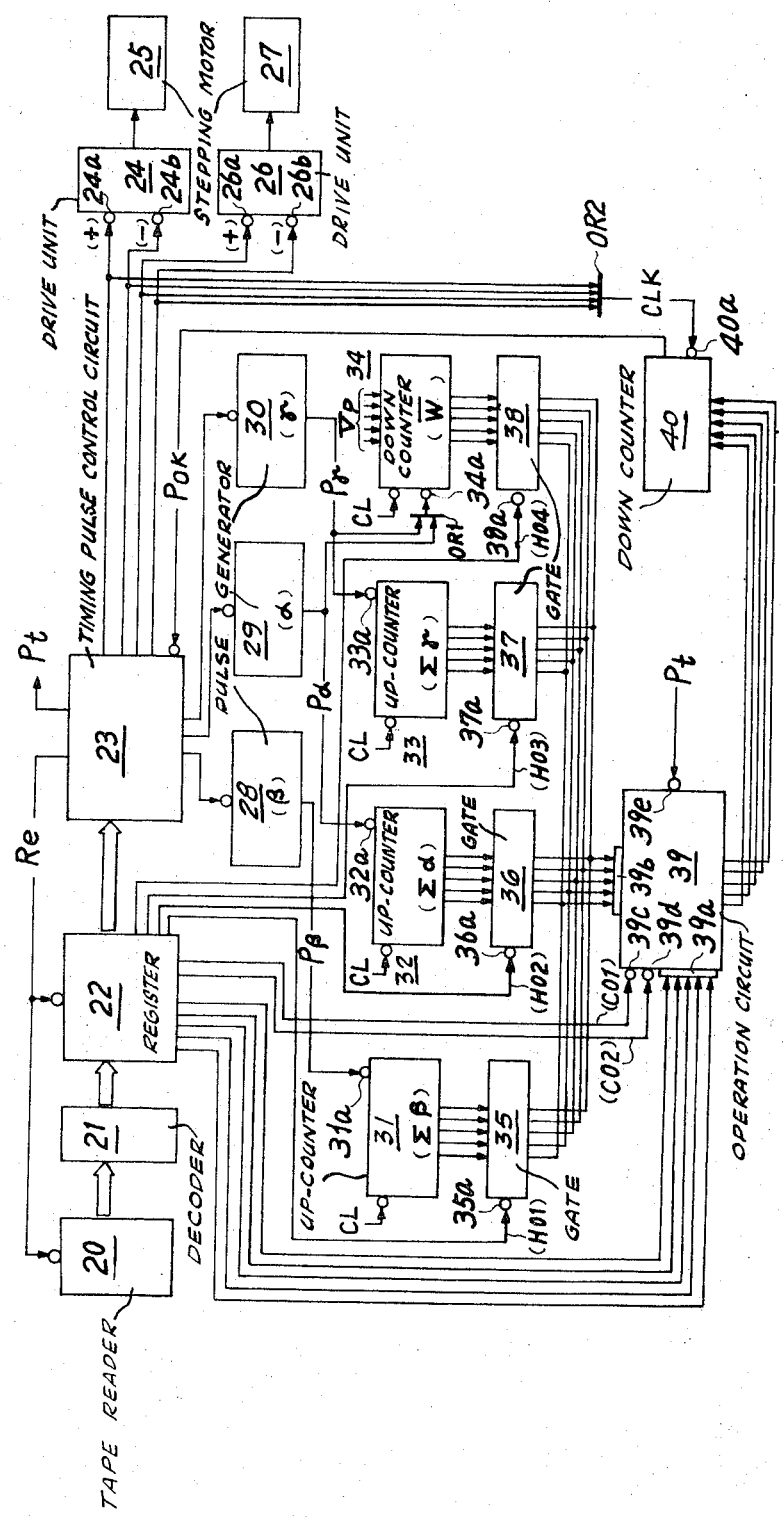
FIG. 2 is a block diagram of the numerical control device of the present invention.

Referring now to the FIG. 2, the numerical control device comprises a tape reader 20 for reading the numerical control information on a punched tape 12, a decoder 21 for decoding the numerical control information out of the tape reader 20, a register circuit 22 for storing the decoded numerical information in separate predetermined registers therein, a pulse distribution and a timing pulse control circuit 23, drive units 24 and 26 for respectively actuating the stepping motors 25 and 27, pulse generators 28, 29 and 30 for respectively generating predetermined numbers of pulse signals corresponding to the dressing or trueing amounts $\beta$, $\alpha$ and $\gamma$ on the grinding wheel 10, up-counters 31, 32 and 33 in which the dressing amounts $\beta$, $\alpha$ and $\gamma$ are respectively integrated, a presetable down-counter 34 in which a preset value Vp corresponding to the initial grinding wheel width is reduced by the pulse signals out of the pulse generators 29 and 30 and provided to input terminal 34a through an OR circuit OR1, gate circuits 35, 36, 37 and 38 for controlling the outputs of the counters 31 to 34, an operation circuit 39 for compensating the numerical data in accordance with the dressing amounts or reduction amounts of the grinding wheel 10 stored in the counters 31 to 34, and a presetable down-counter 40 for controlling the movement of the machine tool.

It is to be noted that well-known registers of the permanent memory type are preferably adopted as the counters 31, 32, 33 and 34 and the contents therein are cleared only when a reset signal CL is manually applied thereto.

The register circuit 22 comprises an axis register 221 for storing the axis information X and Y, a direction register 222 for storing the rotational directions of the stepping motors 25 and 27, and F-code register 223 for storing the F-code number by which the rotational speed of the stepping motors are decided, an M-code register 224 for storing several kinds of auxiliary functions for controlling the grinding machine, an H-code register 225, a C-code register 226 and a numeral register 227 for storing the numerical data which indicates a desired amount of movement of a movable members of the grinding machine. The commands for trueing of the grinding surfaces 11b, 11a and 11c of the grinding wheel 11 are respectively indicated by the M-code function M01, M02 and M03. The H-codes and C-codes are of auxiliary functions like the M-codes. In this embodiment, two types of the C-codes, that is, C01 C02, and four types of the H-codes, that is, H01, H02, H03 and H04 are adopted. The code C01 in the register 226 is applied to an input terminal 39c and is utilized to add the numerical value provided to an input terminal 39b and the numerical data out of the numeral register 222 to an input terminal 39a of the operation circuit 39. On the other hand, the C-code C02 stored in the register 226 is applied to a terminal 29d and is adopted to subtract the numerical value on the input terminal 39b from the numerical data on the input terminal 39a. The H-codes H01, H02, H03 and H04 are selection signals for selectively allowing the numerical value in the counters 31, 32, 33 and 34 to pass through the gate circuits 35, 36, 37 and 38. These H-codes are respectively applied to the input terminals 35a, 36a, 37a and 38a of the gate circuits 35, 36, 37 and 38.

Figure 3:
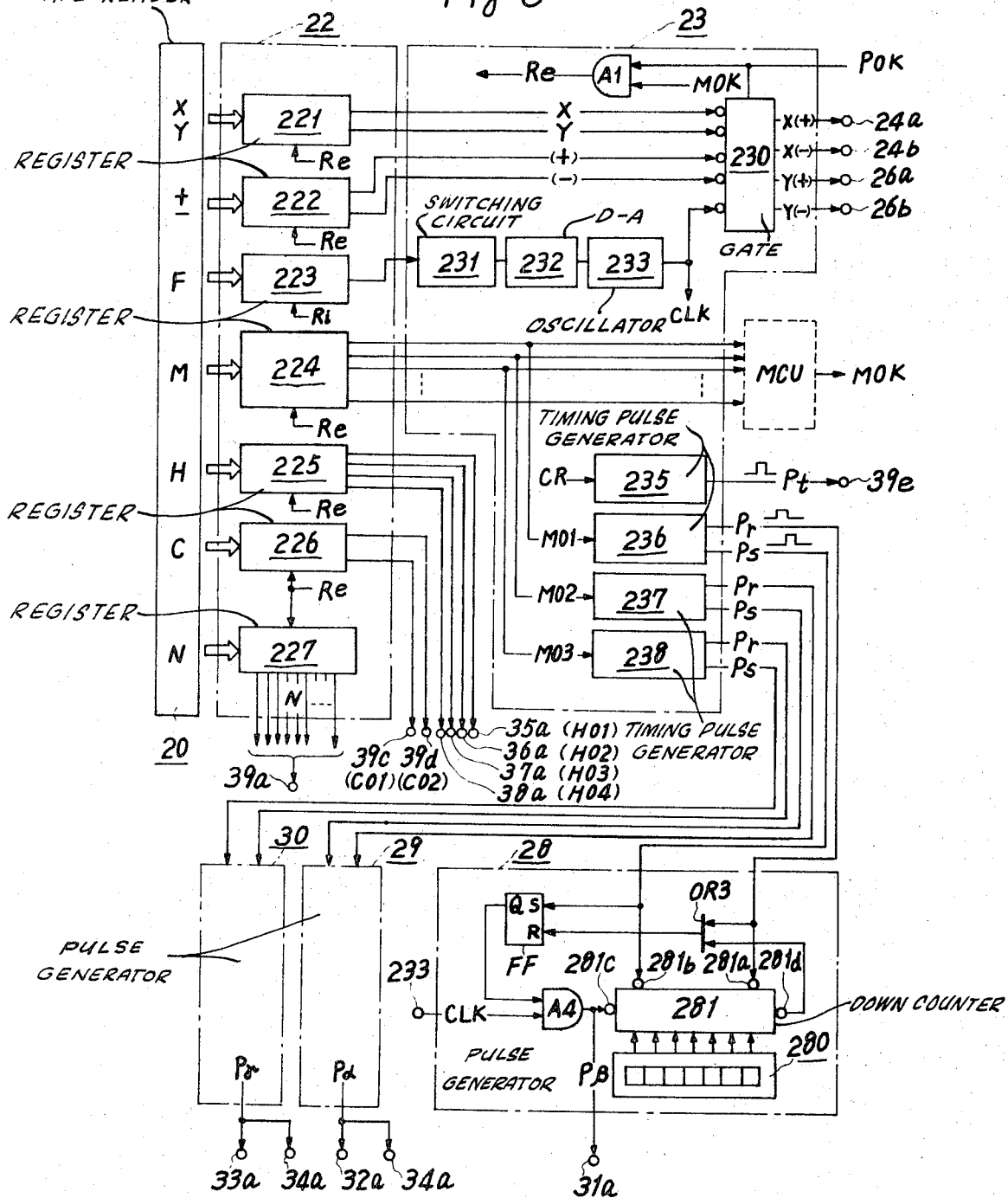
FIG. 3 shows in detail a pulse distribution and timing control circuit for use in FIG. 2.

The pulse distribution and timing pulse control circuit 23 comprises a gate circuit 230, a switching circuit 231, a digital-analog converter (D-A) 232, an oscillator 233, timing pulse generators 235, 236, 237 and 238 and an AND circuit A1 as shown in FIG. 3. The switching circuit 231 is controlled in accordance with the F-code information supplied from the F-code register 223 for selecting an output voltage of the D-A converter 231. The pulse oscillator 233 generates pulse signals CLK of a frequency responsive to the output voltage of the converter 231. The pulse signals CLK are applied to an input terminal 230a of the gate circuit 230 and are distributed to one of the input terminals 24a, 24b, 26a and 26b of the stepping motor drive units 24 and 26 in accordance with the axis information X or Y and the directional information (+) or (−) provided by the axis code register 221 and the direction code register 222 to the gate circuit 230. It should be noted that the gate circuit 230 can pass the pulse signals CLK only when the content in the counter 40 is not zero, that is, when the positioning completion signal POK is not supplied from the counter to the gate circuit 40. When the pulse signals CLK are distributed to the input terminals 24a or 24b or 26a or 26b of the drive units 24 and 26, the grinding wheel 11 or the workpiece 10 mounted on the traverse table is respectively moved in the X(+) or X(−) or Y(+) or Y(−) direction of FIG. 3. The pulse signals CLK from the gate circuit 230 are also applied to a reduction pulse input terminal 40a of the presetable down-counter 40 through OR circuit OR1 for reducing the preset value set by the operation circuit 39.

The above-noted positioning completion signal POK is generated from the counter 40 when the content in the counter 40 is reduced to zero. This signal POK is applied to the gate circuit 230 to remove the output of the pulse signals CLK and one input terminal of the AND circuit A1. To another input terminal of the circuit A1 is provided an auxiliary function or M-code function completion signal MOK which is generated from a machine control unit MCU serving to control the sequence of operation of the grinding machine when the required M-code function has been performed. This circuit A1 generates a signal Re only when both of the signals POK and MOK are applied thereto The signal Re serves to clear the registers 221, 222, 224, 225, 226 and 227 and to advance the punched tape by one block thereof for executing the next numerical control information. It is to be noted that the memory of the F-code register 223 does not clear until it is replaced by a new F-code function therefor.

In the control circuit 23, the timing pulse generator 235 generates one pulse, that is, a timing pulse Pt when a block end code CR which is provided at each block end of the punched tape is applied as an input from the decoder 20. In addition, it should be noted that the timing of the timing pulse can be determined in view of other required conditions which are needed for successfully controlling the grinding machine. The timing pulse $pt$ is applied to an input terminal $39e$ of the operation circuit 39 for modifying the numerical data supplied from the numeral register 227 by the input numerical data given to the input terminal $39b$ in accordance with the C-code function C01 or C02 applied to the terminal $39c$ or $39d$, and for transmitting and presetting the modified numerical data on the down-counter 40. The other timing pulse generators 236, 237 and 238 respectively generate two timing pulses $Pr$, $Ps$ in that order, when the M-code functions M01, M02, M03 are applied thereto.

Figure 4:
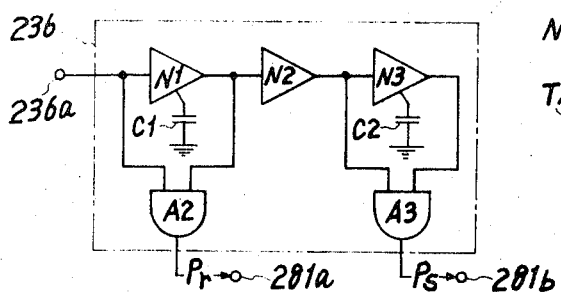
FIG. 4 shows in detail a timing pulse generator for use in FIG. 3.
Figure 5:
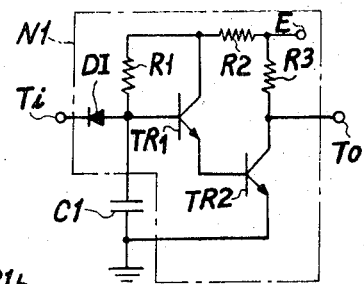
FIG. 5 shows in detail a component circuit of the timing pulse generator of FIG. 4.

Referring now to FIG. 4, a timing pulse generator $23b$ (being the same as the generators 237 and 238) is shown in detail. The generator $23b$ comprises inverters N1, N2 and N3, capacitors C1 and C2 and AND circuits A2 and A3. The inverters N1, N2 and N3 are connected in series and the capacitors C1 and C2 are connected between the inverters N1 and N3 and ground as shown in FIG. 5. When the input of the inverter N1 or N3 is changed from a logic value 0 to 1, the output thereof changes from 1 to 0 with a little time delay which is determined by the capacitance of the capacitor N1 or N3. Accordingly, it will be understood that when the M-code function M01 (the logic value, 1) is applied to the input terminal $236a$, the AND circuits A2 and A3 respectively generate two continuous timing pulses $Pr$ and $Ps$ in that order. In addition, the inverter N1 shown in FIG. 5 comprises a diode D1, transistors TR1 and TR2, electrical resistances R1, R2 and R3, input and output terminals $Ti$ and $To$ and a D-C electric source E as is well known. Furthermore, it should be noted that the timing pulse generator 235 is able to be constructed by the inverter N1, capacitor C1 and AND circuit A2 in the same way as in FIG. 4.

The pulse signals $Pr$ and $Ps$ out of the timing pulse generators 236, 237 and 238 are respectively applied to the pulse generators 28, 29 and 30 for generating a predetermined number of pulse signals $P\beta$, $P\alpha$ and $P\gamma$ corresponding to the dressing amount $\beta$, $\alpha$ and $\gamma$ of the grinding wheel 11 per one dressing operation.

The pulse generators 28, 29 and 30 are of the same construction and therefore, only the pulse generator 28 is shown in detail in FIG. 3. The generator 28 comprises a digital switch 280 for setting the number of pulse signals corresponding to the dressing amount $\beta$ of the grinding wheel 11, a presettable down-counter 281, an AND circuit A4, an OR circuit OR3 and a Flip-Flop circuit FF. The output terminals of the digital switch 280 are connected in parallel to the preset terminal of the presettable downcounter 281, and the set value on the digital switch 280 is set in the downcounter 281 as a preset value when the "Set" pulse signal $Ps$ is applied to a set terminal $281b$ of the down-counter 281. Moreover, the pulse signal $Ps$ from the pulse generator 236 is applied to a set-terminal S of the Flip-Flop circuit FF. A set-output terminal Q of the circuit FF is connected to one of the input terminals of the AND circuit A4. Another input terminal of the circuit A4 is connected to the oscillator 233. The output terminal of the AND circuit A4 is connected to a down pulse input terminal $281c$ of the counter 281 and the input terminal $31a$ of the counter 31 (FIG. 2). Furthermore, the reset-pulse signal $Pr$ from the timing pulse generator 236 is applied to one input terminal of the OR circuit OR3. To another input terminal of the OR circuit OR3 a terminal $281d$ of the counter 281 is connected from which a reset pulse signal is generated when the preset value therein is reduced to zero. The output terminal of the OR circuit OR3 is connected to a reset input terminal R of the Flip-Flop circuit FF.

Accordingly, when the control information M01 is applied to the timing pulse generator 236, the reset signal $Pr$ is first generated therefrom and applied to the reset terminal $281a$ of the counter 281, and therefore the content of the counter 281 is cleared. Following this clear, the Flip-Flop circuit FF is set and the content of the digital switch 280 is set in the counter 281 as a preset value, because the set pulse $Ps$ is applied from the circuit 236 to the terminal $281b$ of the counter 281 and to the set input terminal S of the Flip-Flop circuit FF through the OR circuit OR3. When the Flip-Flop FF is set, the output of the terminal Q thereof changes from a logical value 0 to 1 and this output 1 is applied to the AND circuit A4. Thus, the clock pulses CLK out of the oscillator 233 can pass through the AND circuit A4 and be applied to a terminal $281c$ of the counter 281. The content in the counter 281 is reduced by the pulses provided to the terminal $281c$, and when the content is reduced to zero, terminal $281d$ generates a pulse signal 1 to the reset input terminal R of the Flip-Flop through the OR circuit OR3. Therefore, the Flip-Flop is in a reset condition, and the output of the terminal output pulses $P\beta$ of the AND circuit A4 are stopped. On the other hand, since the pulses $P\beta$ are also applied to the terminal $31a$ of the counter 30, the counter counts the number of the pulses $P\beta$. Thus, the numerical data corresponding to the total dressing amount on the cylindrical surface $11b$ of the grinding wheel 11 is integrated on the counter 31.

In the same way, the total dressing amount on the end surfaces $11a$ and $11c$ of the grinding wheels are respectively stored on the counters 32 and 33, and the actual width $w$ of the grinding wheel 11 is also stored on the counter 34.

The following are some examples of control operations by the control device of the present invention. For ease in understanding the present invention, it is assumed that the work portions $Eo$ and $So$ were correctly finished by the grinding wheel 11, have normal dimensions, and thereafter the grinding wheel 11 has returned to the retraction end thereof and that the surfaces $11a$ and $11b$ of the grinding wheel 11 have already been trued respectively one time in accordance with the control information M01 and M02 provided from the tape reader 20 to the control device. In this case, the dressing amounts $\beta$ and $\alpha$ are respectively stored in the counters 31 and 32 as numerical information corresponding thereto as has already been noted in the above description. At the same time, the preset value in the counter 34 is reduced by the corresponding numerical value $P\alpha$ to the dressing amount $\alpha$, that is, the counter 34 stores the actual width of the grinding wheel. In addition, it is to be noted that the number of the pulse signals $P\alpha$, $P\gamma$, and $P\beta$ are respectively equal to the values.

$\alpha/y$, $\gamma/y$, and $\beta/x$ (where $x =$ a unit movement of the wheelslide or the grinding wheel 11 per one pulse applied to the stepping motor 25, and $y =$ a unit movement of the traverse table or the workpiece 10 per one pulse applied to the stepping motor 27).

Following these operations, when it is required to finish the work portions E1 and S1 of the workpiece 10 at the dimensions as shown in FIG. 1, for example, the hereinbelow noted numerical control information is first given and is read by the tape reader 20 for longitudinally positioning the workpiece 10 against the end surface 11a of the grinding wheel 11:

C02 Y(−) a1 F01 H02 CR

In the above noted information,
C02: the reduction command for the modification as above noted,
Y: the axis command,
(−): the direction command,
a1: the amount of shifting the workpiece 10,
F01: a feed speed command,
H02: the selection signal of the gate 36,
CR: the block end code.

This information is decoded by the decoder 21 and thereafter, is stored in the predetermined registers in the register circuit 22.

Accordingly, it will be easily understood, based upon the foregoing description, that the numerical data a1 is subtracted by the numerical data corresponding to the total dressing amount $\alpha$ in the counter 32 and at the same time the modified (subtracted) numerical information is set in the presetable down-counter 40 as an actual movement data when the timing pulse $Pt$ produced by the code CR is applied to the terminal 39e of the operation circuit 39. Thus, the workpiece 10 is shifted in the left direction in FIG. 1 by the distance $(a1-\alpha)$. That is, the movement amount information a1 is automatically modified or compensated and the trued end surface 11a is properly positioned axially away from the machined reference surface E0 by a distance a1.

Following this operation, the grinding wheel 11 is fed toward the workpiece 10 to grind the shoulder E1 and the cylindrical portion S1 at a rapid speed, a shoulder grinding speed, a rough speed and thereafter a fine grinding speed by three blocks of the numerical control information and sequential control. In this procedure, the above noted information C01 and H01 is applied to one of the blocks of the numerical control information. Therefore, the numerical information for advancing the grinding wheel 11 is modified to a value $(b1+\beta)$ in total and the diameter of the work portion S1 is precisely obtained as well as the position of the shoulder E1.

In this way, the numerical information for positioning the movable member, such as the wheelslide and the transverse table, is automatically modified or compensated by $+m.\alpha$ or $+n.\beta$ or $+p.\gamma$ (where $m$, $n$, and $p$ are the dressing times of each grinding surfaces) by a combination of the simple code information C01 and C02 and H01, H02 and H03.

In addition, in the case wherein it is required to index the traverse table for grinding the work portions E3 and S3 of the workpiece 10 after the grinding operations of the work portions E2 and S2, the following numerical control information is applied to the tape reader 20:

C01 Y(+) (a0+a1+a2) F01 H04 CR or

C02 Y(+) (a0+a1+a2+W) F01 H02 CR (W is the initial width of the grinding wheel 11)

In this case, it will be clearly understood that the compensated numerical data $(a0+a1+a2+\overline{W})$ where $\overline{W}$ is the actual width of grinding wheel 11 stored in the counter 34, is set in the presettable down counter 40, and therefore, the desired indexing of the table to the end surface 11c of the grinding wheel 11 will be correctly performed.

Obviously many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. In a numerical control device for machine tools, particularly grinding machines, having information reading means for reading numerical control information from a numerical control information source, decoding means for decoding said numerical control information supplied from said information reading means, and a control circuit for controlling at least one grinding machine in accordance with said numerical control information supplied from said decoding means thereto the improvement comprising:
   at least one pulse generating means for generating a predetermined number of pulse signals corresponding to a dressing amount of a grinding wheel when the same is being dressed;
   at least one counter connected to said pulse generating means for automatically integrating said pulse signals out of said pulse generating means;
   operating means connected to said counter and said information reading means for automatically modifying numerical data on a movement of said machine tool grinding machine in said numerical control information supplied from said information reading means by a total dressing amount integrated in said counter; and,
   drive control means for controlling the movement of said grinding machine by said compensated or modified numerical data from said operating means.

2. A numerical control device as in claim 1, further comprising gate circuit means provided between said counter and said operating means for controlling data transmission from said counter to said operating means by means of selection signals in said numerical control information.

3. A numerical control device as in claim 2, wherein said operating means is able to add said total decrement amount in said counter to said numerical data in said numerical control information.

4. A numerical control device as in claim 2, wherein said operating means is able to subtract said total decrement amount in said counter from said numerical data in accordance with control signals in said numerical control information.

5. A numerical control device as in claim 3, further comprising a timing control circuit for controlling timing of said pulse generating means and said operating means.

6. A numerical control device as in claim 4, further comprising a timing control circuit for controlling timing of said pulse generating means and said operating means.

7. A numerical control device as in claim 3, further comprising at least one presetable down counter in which a preset value corresponding to an initial dimension of said grinding wheel is reduced by said pulse signals out of said pulse generating means for storing an actual dimension of said cutting tool grinding wheel, and gate circuit means for controlling data transmission from said presetable down counter to said operating means.

8. A numerical control device as in claim 2, wherein the number of said pulse signals from said pulse generating means is adjustable in accordance with said dressing amount.

9. In a numerical control device for a machine tool, particularly a grinding machine having a tape reader, a decoder for decoding numerical control information from said tape reader, a register circuit for storing said numerical control information from said decoder, and a control circuit for controlling said grinding machine in accordance with said numerical control information, the improvement comprising:
  a plurality of pulse generators for respectively generating a predetermined number of pulse signals when respective grinding surfaces of a grinding wheel are dressed or trued by a predetermined amount;
  a plurality of counters for respectively integrating said pulse signals from said pulse generators;
  operating means for modifying numerical data on a movement of said grinding machine by a total dressing amount stored in one of said counters, said operating means being able to add said total dressing amount to said numerical data in accordance with numerical control information;
  gate circuit means for selectively serving to allow a transmission of data integrated in one of said counters therefrom to said operating means; and
  drive control means for controlling the movement of said grinding machine by said modified numerical data.

10. In a numerical control device for a machine tool, particularly a grinding machine having a tape reader, a decoder for decoding numerical control informations from said tape reader, a register circuit for storing said numerical control information from said decoder, and a control circuit for controlling said grinding machine in accordance with said numerical control information, the improvement comprising:
  a plurality of pulse generators for respectively generating a predetermined number of pulse signals when respective grinding surfaces of a grinding wheel are dressed or trued by a predetermined amount;
  a plurality of counters for respectively integrating said pulse signals out of said pulse generators.
  operating means for modifying numerical data on a movement of said grinding machine by a total dressing amount stored in one of said counters, said operating means being able to subtract said total dressing amount from said numerical data in accordance with numerical information;
  gate circuit means for selectively serving to allow a transmission of data integrated in one of said counters therefrom to said operating means; and
  drive control means for controlling the movement of said grinding machine by said modified numerical data.

* * * * *